(12) United States Patent
Sakashita et al.

(10) Patent No.: US 9,863,300 B2
(45) Date of Patent: Jan. 9, 2018

(54) HOLDING JIG AND PRESSURE LOSS MEASURING DEVICE

(71) Applicant: NGK Insulators, Ltd., Nagoya (JP)

(72) Inventors: Satoshi Sakashita, Nagoya (JP); Masayuki Uchida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 594 days.

(21) Appl. No.: 14/450,589

(22) Filed: Aug. 4, 2014

(65) Prior Publication Data

US 2014/0338435 A1 Nov. 20, 2014

Related U.S. Application Data

(63) Continuation of application No. PCT/JP2013/054620, filed on Feb. 22, 2013.

(30) Foreign Application Priority Data

Feb. 23, 2012 (JP) ................... 2012-037738

(51) Int. Cl.
*G01M 3/02* (2006.01)
*F01N 11/00* (2006.01)
(Continued)

(52) U.S. Cl.
CPC .......... *F01N 11/00* (2013.01); *B01D 46/0002* (2013.01); *B25B 11/00* (2013.01); *G01L 19/0007* (2013.01); *F01N 3/28* (2013.01)

(58) Field of Classification Search
CPC ..... F01N 11/00; B25B 11/00; B01D 46/0002; B25J 15/08; G01M 3/02; G01F 5/00
(Continued)

(56) References Cited

U.S. PATENT DOCUMENTS 5,182,140 A 1/1993 Watanabe et al.
5,306,469 A 4/1994 Iles
(Continued)

FOREIGN PATENT DOCUMENTS

CN 2805947 Y 8/2006
EP 2 243 988 A1 10/2010
(Continued)

OTHER PUBLICATIONS

Extended European Search Report (Application No. 13739342.7) dated Jun. 10, 2015.
(Continued)

*Primary Examiner* — Lisa Caputo
*Assistant Examiner* — Octavia Hollington
(74) *Attorney, Agent, or Firm* — Burr & Brown, PLLC

(57) ABSTRACT

A holding jig has a tubular jig base member, and a tubular expansion/contraction member disposed on an inner peripheral surface side of the tubular jig base member. Both end sides of the tubular expansion/contraction member are fixed to both end sides of the tubular jig base member along the whole periphery. A configuration of an inner peripheral surface of the tubular expansion/contraction member is smaller than a surface configuration of a pillar-like body (a honeycomb structure) to be held. On the other hand, a configuration of an inner peripheral surface of the tubular jig base member is larger than the surface configuration of the pillar-like body (the honeycomb structure) to be held.

15 Claims, 6 Drawing Sheets

(51) Int. Cl.
*B01D 46/00* (2006.01)
*B25B 11/00* (2006.01)
*G01L 19/00* (2006.01)
*F01N 3/28* (2006.01)

(58) Field of Classification Search
USPC .......................... 73/37, 114.75, 38, 202, 204
See application file for complete search history.

(56) References Cited

U.S. PATENT DOCUMENTS

| | | | |
|---|---|---|---|
| 5,372,786 A | 12/1994 | Iles | |
| 5,398,541 A * | 3/1995 | Hijikata | B01D 46/0063 |
| | | | 73/38 |
| 5,407,640 A | 4/1995 | Iles | |
| 5,422,138 A | 6/1995 | Watanabe et al. | |
| 5,558,714 A | 9/1996 | Watanabe et al. | |
| 7,608,138 B2 * | 10/2009 | Sakashita | B01D 46/0086 |
| | | | 210/411 |
| 8,511,659 B2 * | 8/2013 | Hirakawa | B25B 1/18 |
| | | | 269/254 CS |
| 2007/0163445 A1 | 7/2007 | Sakashita et al. | |
| 2010/0244345 A1 | 9/2010 | Hirakawa et al. | |
| 2010/0283213 A1 * | 11/2010 | Enomoto | F01N 3/28 |
| | | | 277/634 |

FOREIGN PATENT DOCUMENTS

| | | |
|---|---|---|
| JP | 04-041194 A1 | 2/1992 |
| JP | 08-507380 A1 | 8/1996 |
| JP | 2807370 B2 | 10/1998 |
| JP | 2008-254904 A1 | 10/2008 |
| JP | 4307974 B2 | 8/2009 |
| JP | 2010-237170 A1 | 10/2010 |
| WO | 95/01297 A1 | 1/1995 |

OTHER PUBLICATIONS

International Search Report and Written Opinion (Application No. PCT/JP2013/054620) dated Mar. 26, 2013.

* cited by examiner

HOLDING JIG AND PRESSURE LOSS MEASURING DEVICE

BACKGROUND OF THE INVENTION

Field of the Invention

The present invention relates to a jig which can hold a pillar-like body without causing damage to the pillar-like body, even when the pillar-like body has an irregular shape, a poor shape accuracy, and brittleness, and relates to a device which measures a pressure loss of the pillar-like body held by the jig.

Description of Related Art

As a loading body onto which a catalyst to purify an exhaust gas of an automobile is loaded, a honeycomb structure is often used. This honeycomb structure is also broadly used as a particulate filter (PF) which collects and removes a particulate matter (PM) included in the exhaust gas. Moreover, examples of the PF include a DPF for a diesel engine and a GPF for a gasoline engine.

In general, the honeycomb structure is a brittle ceramic product, and an outer shape of the honeycomb structure is columnar in many cases. In the honeycomb structure, a plurality of cells are arranged so as to communicate between two end surfaces of the columnar body. The cells are formed by a plurality of partition walls, and the partition walls are porous walls having a large number of pores. Moreover, when the honeycomb structure is used as the PF, (exhaust gas) inflow end surfaces of predetermined cells and (exhaust gas) outflow end surfaces of the remaining cells are alternately plugged. When the honeycomb structure is used as the PF, the exhaust gas which has flowed into the cells from an inflow end surface side is discharged from an outflow end surface side through the partition walls which function as filter layers. At this time, the particulate matter in the exhaust gas is trapped on the porous partition walls.

The catalyst or filter using such a honeycomb structure is usually disposed in through channels of the exhaust gas (e.g., exhaust tubes of the automobile). Therefore, when the exhaust gas passes through the honeycomb structure, a resistance takes place and has an influence on a performance of the engine. In consequence, as one of specifications of the catalyst or the filter, a pressure loss at a predetermined flow rate is requested to be provided.

From such situations, there arises a necessity of measuring the pressure loss of the honeycomb structure which is the catalyst loading body or filter itself. Moreover, in the measurement of the pressure loss, it is necessary to firmly hold and fix the honeycomb structure which is a measurement object so that the honeycomb structure does not become unstable during the measurement even when the exhaust gas for the measurement is allowed to flow at the predetermined flow rate. Heretofore, the measurement of the pressure loss and the holding of the honeycomb structure for the measurement have been performed by means (conventional art) disclosed, for example, in Patent Documents 1 to 3.

In recent years, however, as the honeycomb structures, integrally formed products have increased in which an outer shape is pillar-like but is not columnar (a cross section perpendicular to a central axis is not round) and the cross section has an irregular shape. In the honeycomb structures having such an irregular shape, a shape (a dimension) varies sometimes as much as about ±10 mm or more from a design value which is a reference. This is because the honeycomb structure is manufactured through a firing process of a ceramic material. In particular, when the cross section is elliptic, a deviation concerning perpendicularity or torsion (circumferential deflection) easily increases. Moreover, the integrally formed product is not subjected to shape correction processing, and hence in the above conventional technology, it is difficult to hold the honeycomb structure having a poor shape accuracy and to accurately measure the pressure loss sometimes. A reason for this case is that at the measurement of the pressure loss, it is necessary to hold the honeycomb structure in such an airtight state that a total amount of the exhaust gas for the measurement passes through the honeycomb structure without any leakage, but in the conventional technology, the honeycomb structure having the varying shape accuracy cannot be held with an excellent air tightness. In the conventional technology, a limit of a shape tolerance of the honeycomb structure to be held (a difference between a maximum value and a minimum value of an allowable dimension) has been about ±2 mm when the cross section is round, and about ±1 mm when the cross section has the irregular shape.

PRIOR ART DOCUMENTS

Patent Documents

Patent Document 1: JP 2807370
Patent Document 2: JP 4307974
Patent Document 3: JP-A-2010-237170

SUMMARY OF THE INVENTION

Problem to be Solved by the Invention

The present invention has been developed in view of such a situation. A problem of the present invention lies in that there is provided means capable of holding even a honeycomb structure having an irregular shape in which a shape accuracy easily varies (needless to say, even the honeycomb structure having a round cross section) with excellent air tightness and that through the means, accurate pressure loss measurement is realized for a broad measurement object (the honeycomb structure) in which the shape accuracy varies. As a result of repeated investigations, it has been found that the problem is solved by the following means, and the present invention has been completed.

Means for Solving the Problem

That is, first, according to the present invention, there is provided a holding jig holding a pillar-like body, which has a tubular jig base member, and a tubular expansion/contraction member disposed on an inner peripheral surface side of the tubular jig base member, wherein both end sides of the tubular expansion/contraction member are fixed to both end sides of the tubular jig base member along the whole periphery, a configuration of the inner peripheral surface of the tubular expansion/contraction member is smaller than a surface configuration (an outside shape) of the pillar-like body to be held, and a configuration of the inner peripheral surface of the tubular jig base member is larger than the surface configuration (the outside shape) of the pillar-like body to be held.

In the holding jig according to the present invention, the configuration of the inner peripheral surface of the above tubular expansion/contraction member is preferably from 3 to 50% smaller than the surface configuration of the pillar-like body to be held.

In the holding jig according to the present invention, as described previously, the configuration of the inner peripheral surface of the tubular expansion/contraction member is smaller than the surface configuration (the outside shape) of the pillar-like body to be held. Here, a degree of the smallness of a configuration of the inner peripheral surface of the tubular expansion/contraction member to a surface configuration of the pillar-like body to be held will be called an expansion/contraction member shape ratio. Moreover, when the configuration of the inner peripheral surface of the tubular expansion/contraction member is from 3 to 50% smaller than the surface configuration of the pillar-like body to be held, it is described that the expansion/contraction member shape ratio is from 3 to 50%. This expansion/contraction member shape ratio is regulated by a length from a central axis to a periphery in a shape of each cross section, when the shape of the cross section of the tubular expansion/contraction member is analogous to the shape of the cross section of the pillar-like body to be held. The length is, for example, a radius when the cross section has a round shape, and a long diameter or a short diameter when the cross section has an elliptic shape. The shape of the cross section of the tubular expansion/contraction member or the pillar-like body is the shape of the cross section of the tubular body or the pillar-like body which is perpendicular to an axial direction. The configuration of the inner peripheral surface of the tubular expansion/contraction member is smaller than the surface configuration (the outside shape) of the pillar-like body to be held, and hence a peripheral length of the shape of the cross section of the tubular expansion/contraction member is shorter than a peripheral length of the shape of the cross section of the pillar-like body to be held. Moreover, in actuality, an expansion/contraction member such as a rubber tube is not a regular shape body, but the member is not expanded or contracted, and is considered to have a predetermined configuration, and a shape analogous to the shape of the cross section of the pillar-like body is assumed, to calculate the expansion/contraction member shape ratio. For example, when the pillar-like body is an elliptic pillar body and the cross section of the body is elliptic, an analogous ellipse is also assumed for the cross section of the tubular expansion/contraction member, to calculate the expansion/contraction member shape ratio.

In the holding jig according to the present invention, the configuration of the inner peripheral surface of the above tubular jig base member is preferably larger than the surface configuration of the pillar-like body to be held as much as a difference in a range of more than 1 mm and 20 mm or less.

In the holding jig according to the present invention, as described previously, the configuration of the inner peripheral surface of the tubular jig base member is larger than the surface configuration (the outside shape) of the pillar-like body to be held. Here, a degree (the difference) of the configuration of the inner peripheral surface of the tubular jig base member to the surface configuration of the pillar-like body to be held will be called a jig base member shape difference. Furthermore, when the configuration of the inner peripheral surface of the tubular jig base member is larger than the surface configuration of the pillar-like body to be held as much as the difference in the range of more than 1 mm and 20 mm or less, it is described that the jig base member shape difference is in excess of 1 mm and 20 mm or less. On the assumption that the shape of the cross section of the tubular jig base member is generally analogous to the shape of the cross section of the pillar-like body to be held, the jig base member shape difference is obtained on the basis of the length from the central axis to the periphery in each of the shapes of the cross sections. The length is, for example, the radius when the shape of the cross section is round, and is the long diameter or the short diameter when the shape of the cross section is elliptic. The configuration of the cross section of the tubular jig base member or the pillar-like body is the configuration of the cross section of the tubular body or the pillar-like body which is perpendicular to the axial direction. The configuration of the inner peripheral surface of the tubular jig base member is larger than the surface configuration (the outside shape) of the pillar-like body to be held, and hence a peripheral length of the configuration of the cross section of the tubular jig base member is larger than the peripheral length of the configuration of the cross section of the pillar-like body to be held. However, the surface configuration of the pillar-like body varies sometimes, and the configuration of the cross section of the tubular jig base member does not have to be strictly analogous to the configuration of the cross section of the pillar-like body to be held. The configuration of the inner peripheral surface of the tubular jig base member may be such a configuration that can contain the pillar-like body, and the jig base member shape difference is preferably in excess of 1 mm and 20 mm or less.

The holding jig according to the present invention preferably has a hole extending through an outer peripheral surface and an inner peripheral surface of the above tubular jig base member, and opening/closing means for opening and closing the hole, and the hole is preferably connected to vacuum generating means via the opening/closing means. When this hole and the opening/closing means are disposed, the hole is further preferably connected to pressurizing means via the opening/closing means.

Primitive opening/closing means are a joint and a lid, and preferably as the opening/closing means, a valve or the joint (a port) having an opening/closing function can be employed. Both the vacuum generating means and the pressurizing means are preferably connected, and in this case, the opening/closing means is preferably a three-way valve. The vacuum generating means may be any means that can generate a vacuum in the hole. As the vacuum generating means, for example, a vacuum pump, an ejector or another vacuum generating unit may be disposed, but the means disposed in another place may only be connected via a piping line. Similarly, the pressurizing means may be any means that can increase a pressure of the atmosphere (air) in the hole. A pressurizing object is finally the tubular expansion/contraction member. As the pressurizing means, for example, a compressor or another pressurizing unit may be disposed, but the means disposed in another place may only be connected via a piping line.

In the holding jig according to the present invention, the inner peripheral surface of the tubular jig base member is preferably provided with a concave portion along the whole periphery.

In the holding jig according to the present invention, the inner peripheral surface of the tubular jig, base member is preferably provided with a groove along the whole periphery.

In the holding jig according to the present invention, a plurality of sets of the above holes and opening/closing means may be arranged, but when this groove is formed, one set of the hole and opening/closing means may be disposed. In this groove, the above hole is preferably disposed.

In the inner peripheral surface of the tubular jig base member, both the concave portion along the whole periphery and the groove along the whole periphery are especially preferably formed, and in this case, the groove is formed in a surface to be provided with the concave portion is formed (this is also the inner peripheral surface).

In the holding jig according to the present invention, the tubular expansion/contraction member is preferably a rubber tube. In this case, a material of the rubber tube is preferably a natural rubber.

In the rubber tube, a seam may be present, but a stepped portion is scarcely present (0.5 mm or less), and it is essential that a tensile strength of the seam and an elongation amount to tension are about the same (within ±10%) as those of another portion (other than the seam).

In the holding jig according to the present invention, an axial length of the above tubular jig base member is preferably smaller than an axial length of the pillar-like body to be held as much as a difference in a range of 5 mm or more and 10 mm or less.

The holding jig according to the present invention is suitably used, when the pillar-like body to be held is a honeycomb structure. The holding jig according to the present invention is suitably used, especially when the honeycomb structure is made of a ceramic material and has an irregular shape.

The pillar-like body as an object to be held by the holding jig according to the present invention is an object having a pillar-like surface configuration. Moreover, the pillar-like body for which the holding jig according to the present invention is suitably used is a pillar-like body in which an inner structure is a honeycomb structure (i.e., the above honeycomb structure).

Moreover, the irregular shape usually means a shape different from a regular shape, but the irregular shape mentioned in the present description is a surface configuration of the pillar-like body in which a cross section perpendicular to the central axis of the pillar-like body is not round. When a round shape or an elliptic shape is simply described for the pillar-like body, it is meant that the cross section of the pillar-like body is round or elliptic, and in this case, the pillar-like body has a surface configuration of a columnar body or an elliptic pillar body.

Next, according to the present invention, there is provided a pressure loss measuring device to measure a pressure loss of a fluid which takes place, when the fluid passes through a pillar-like honeycomb structure having an inflow end surface and an outflow end surface through which the fluid flows in and out, the pressure loss measuring device including honeycomb structure holding means for holding the honeycomb structure; fluid passing means for driving so that the fluid passes through the honeycomb structure; flow rate measuring means for measuring a flow rate of the fluid passing through the honeycomb structure; pressure loss measuring means for measuring the pressure loss which takes place when the fluid passes through the honeycomb structure at the flow rate measured by the flow rate measuring means; and a through channel which interconnects the four means to one another so that the fluid passes through the respective means, wherein as the honeycomb structure holding means, there is used the holding jig according to the present invention in a case where the pillar-like body to be held is the honeycomb structure.

Examples of the above-mentioned pressure loss measuring device include pressure loss measuring devices disclosed in Patent Documents 1 to 3, in which one of the above holding jigs is used as means for holding the honeycomb structure.

Effect of the Invention

A holding jig according to the present invention is a holding jig holding a pillar-like body. The holding jig has a tubular jig base member, and a tubular expansion/contraction member disposed on an inner peripheral surface side of the tubular jig base member, and both end sides of the tubular expansion/contraction member are fixed to both end sides of the tubular jig base member along the whole periphery. Here, both the end sides of the tubular expansion/contraction member or jig base member are sides of both end portions which are open in a tubular body. Both the end sides of the tubular expansion/contraction member disposed on an inner peripheral surface side of the tubular jig base member are fixed to both the end sides of the tubular jig base member along the whole periphery, and hence the tubular expansion/contraction member can be stretched from the tubular jig base member as a base point. Furthermore, a space is formed between the tubular expansion/contraction member and the tubular jig base member.

Moreover, in the holding jig according to the present invention, a configuration of the inner peripheral surface of the tubular expansion/contraction member is smaller than an surface configuration of the pillar-like body to be held, and a configuration of the inner peripheral surface of the tubular jig base member is larger than the surface configuration of the pillar-like body to be held. Therefore, when the tubular expansion/contraction member is stretched to enlarge an inner periphery, the pillar-like body can be contained in the tubular jig base member. In this state, when the stretched expansion/contraction member is restored, the expansion/contraction member, in which the configuration of the inner peripheral surface is small, comes in contact under pressure with the pillar-like body, and the pillar-like body can firmly be held by the expansion/contraction member.

In this holding jig according to the present invention, when the configuration of the inner peripheral surface of the tubular jig base member is made to be larger than the surface configuration of the pillar-like body to be held so as to include a maximum value of an allowable dimension of the pillar-like body, suitable holding can be realized irrespective of whether the cross sectional shape of the pillar-like body is a round shape or an irregular shape, or without an influence of a shape accuracy in a case where the pillar-like body is an integrally formed ceramic product. Moreover, the holding is performed by utilizing expansion/contraction properties (an expansion/contraction ratio and an expansion/contraction force) of the expansion/contraction member, and hence a shape tolerance and maximum error of the pillar-like body can be set to be larger.

Furthermore, the honeycomb structure which is a catalyst loading body or filter itself is made of a ceramic material, and has a thin outer wall and an easily chippable edge. However, also when this structure is the pillar-like body to be held, the holding jig according to the present invention holds the pillar-like body by the expansion/contraction member, so that possibilities of damages are decreased. In the holding jig according to the present invention, unlike a conventional holding jig, a peripheral surface in the vicinity of an end surface of the pillar-like body to be held is not partially held, but the pillar-like body is held by using the whole inner peripheral surface of the tubular expansion/contraction member. Therefore, also in this respect, the edge is not easily chipped, and the possibilities of the damages are decreased. In addition, a large contact area of the tubular expansion/contraction member can be acquired, and hence the pillar-like body can firmly be held with a small holding force. Consequently, compressive damages due to generation of an inadvertently large holding force do not easily take place. Moreover, in the holding jig according to the present invention, a holding area of the tubular expansion/contraction member is large. Therefore, even when the peripheral surface of the pillar-like body to be held has a corrugated shape, the body can suitably be held.

In a preferable aspect of the holding jig according to the present invention, the configuration of the inner peripheral surface of the above tubular expansion/contraction member is from 3 to 50% smaller than the surface configuration of the pillar-like body to be held. Therefore, it is possible to hold the pillar-like body only by the stretched expansion/contraction member, without depending on separate pressurizing means. A force to hold the pillar-like body (the holding force) can be regulated by setting an expansion/contraction member shape ratio, or selecting a material of the expansion/contraction member (e.g., the expansion/contraction properties (the expansion/contraction ratio and the expansion/contraction force) of a rubber of a rubber tube, and a mechanical strength of the rubber). This holding force is a pressure contact force (a pressure) of the expansion/contraction member onto the pillar-like body. In the holding jig according to the present invention, the expansion/contraction member shape ratio is in a broad range of 3 to 50%, and hence this expansion/contraction member shape ratio is easily regulated in accordance with the strength or a mass of the pillar-like body which is a holding object. Therefore, the holding force required for holding the pillar-like body can also easily be adjusted. The adjustment by the separate pressurizing means is not necessarily required. Moreover, as the expansion/contraction member, a member which can further stretch even in such a state as to hold the pillar-like body can be employed. In this case, it is possible to avoid generation of creases in the expansion/contraction member due to a curvature change of the peripheral surface, when the pillar-like body has the irregular shape. The generation of the creases can be a factor for generation of a non-uniform compressive stress in the held pillar-like body, but according to this preferable aspect, this can be prevented, so that the holding force becomes uniform for the pillar-like body.

In the preferable aspect of the holding jig according to the present invention, the configuration of the inner peripheral surface of the tubular jig base member is larger than the surface configuration of the pillar-like body to be held as much as a difference in a range of more than 1 mm and 20 mm or less. Therefore, when a center value of the range is used as a reference value (a design value) of the configuration, it is possible to cope with a shape tolerance of about ±10 mm even in the case of the irregular shape. When the configuration of the inner peripheral surface of the tubular jig base member is larger than the surface configuration of the pillar-like body to be held, a clearance is present between the tubular jig base member and the pillar-like body. The clearance can be provided with a large dimension as described above, and hence an attaching/detaching operation of the pillar-like body can easily and quickly be performed.

The holding jig according to the present invention has, in the preferable aspect thereof, a hole extending through an outer peripheral surface and an inner peripheral surface of the tubular jig base member, and opening/closing means for opening and closing the hole, and the hole is connected to vacuum generating means via the opening/closing means. Therefore, when the pillar-like body is attached or detached, a vacuum (a negative pressure) is generated in a space between the tubular jig base member and the tubular expansion/contraction member, so that the tubular expansion/contraction member can be attached to the surface (the inner peripheral surface) of the tubular jig base member. In this case, at the attachment/detachment of the pillar-like body, a holding operation can be completed without any friction between the tubular expansion/contraction member and the pillar-like body. Therefore, damage (the chipping of the edge, etc.) is not easily caused to the pillar-like body, and the expansion/contraction member does not easily deteriorate, which obviates the need for frequent changing.

In the preferable aspect of the holding jig according to the present invention, the hole is connected to pressurizing means via the opening/closing means. Therefore, it is possible to expand the space (stretch the expansion/contraction member), for example, by blowing air into the space between the tubular jig base member and the tubular expansion/contraction member. Therefore, the holding force of the pillar-like body can easily be regulated, for example, by an air pressure. Moreover, the uniform holding force can stably be generated irrespective of the shape of the pillar-like body. As described previously, the holding force can be regulated by setting the expansion/contraction member shape ratio or selecting the material of the expansion/contraction member, but application of this air pressure is effective for the purpose of generating a holding force of a range which cannot be covered by the above regulating measures. It is possible to adjust the holding force more finely by the air pressure than by the setting of the expansion/contraction member shape ratio or the selection of the material of the expansion/contraction member. Furthermore, when a rubber tube having an excellent flexibility is selected as the expansion/contraction member and the holding force is generated by the air pressure, the rubber tube is allowed to follow the shape of the surface of the pillar-like body, thereby making it possible to hold the pillar-like body with a uniform holding force onto the peripheral surface, even in a case where concaves and convexes are present in the peripheral surface of the pillar-like body to be held.

In the preferable aspect of the holding jig according to the present invention, the inner peripheral surface of the tubular jig base member is provided with a concave portion along the whole periphery. Therefore, the tubular expansion/contraction member is easily expanded and contracted, and a holding and releasing (not holding) operation of the pillar-like body (also referred to as the attachment/detachment) is easily performed. This is because when the concave portion is formed, the space is formed between the tubular expansion/contraction member and the tubular jig base member, even in a case where the tubular expansion/contraction member is not stretched. In the space, the tubular expansion/contraction member does not come in contact closely with the tubular jig base member. Moreover, the hole extending through the outer peripheral surface and the inner peripheral surface of the tubular jig base member communicates with this space. Therefore, a pressure of this space can be decreased through the hole by the above vacuum generating means, so that the expansion/contraction member can be attached to the surface (the inner surface including the concave portion) of the jig base member. Furthermore, this space can be pressurized through the hole by the above pressurizing means, and hence the expansion/contraction member can come in contact under pressure with the peripheral surface of the pillar-like body by this pressurizing force in addition to the pressure contact force of the expansion/contraction member itself.

In the preferable aspect of the holding jig according to the present invention, the inner peripheral surface of the tubular jig base member is provided with a groove along the whole periphery. Therefore, the tubular expansion/contraction member is easily expanded and contracted, and the holding and releasing operation (the attachment/detachment) of the pillar-like body is easily performed. This is because the tubular expansion/contraction member is always disposed away from the tubular jig base member in the groove. The tubular expansion/contraction member is disposed on the side of the inner peripheral surface of the tubular jig base member, and hence when the concave portion is not disposed, both the members come in contact with each other. Moreover, even when the concave portion is disposed, a vacuum is generated in the space between the tubular jig base member and the tubular expansion/contraction member, and the tubular expansion/contraction member is attached to the surface of the tubular jig base member sometimes. In this state, when the tubular expansion/contraction member has adhesive properties, the member adheres to the tubular jig base member, and the tubular expansion/contraction member is not easily expanded or contracted. However, when the groove is formed, the tubular expansion/contraction member is disposed away from the tubular jig base member in the groove, so that the tubular expansion/contraction member is easily expanded and contracted. Furthermore, when the air is blown into the space to pressurize the space by the above pressurizing means, the air travels along this groove to easily flow along the whole periphery. Therefore, when the groove is disposed, (one set of) one hole and one opening/closing means may be disposed.

In the preferable aspect of the holding jig according to the present invention, as the tubular expansion/contraction member, the rubber tube is used, and hence the tubular expansion/contraction member can inexpensively be prepared. Moreover, in an especially preferable aspect, a material of the rubber tube which is the expansion/contraction member is a natural rubber having a rough surface. Therefore, this expansion/contraction member (the natural rubber) easily comes in contact closely with the peripheral surface of the pillar-like body, and even when the pressure contact force (the pressure) onto the pillar-like body is small, the pillar-like body can suitably be held.

In the preferable aspect of the holding jig according to the present invention, an axial length of the tubular jig base member is larger than an axial length of the pillar-like body to be held as much as a difference in a range of 5 mm or more and 10 mm or less. Therefore, in a state where one end portion (e.g., a peripheral surface portion in the vicinity of an upper end surface) of the pillar-like body remains to be held, the pillar-like body can be contained in the holding jig, thereby enabling completion of the holding operation. Consequently, during the holding, the pillar-like body can be prevented from being dropped into the tubular jig base member, and the other end portion (e.g., a lower end surface portion) of the pillar-like body is not damaged.

In a pressure loss measuring device according to the present invention, the holding jig according to the present invention is used as honeycomb structure holding means, and hence a pressure loss of the honeycomb structure which is the catalyst loading body or filter itself can accurately be measured. This is because the holding jig according to the present invention can hold the honeycomb structure without causing any pressure leakage. For example, the creases are not easily generated in the expansion/contraction member of the holding jig according to the present invention as described previously. The creases become factors for the pressure leakage. However, when the generation of the creases can be prevented, air tightness can be acquired, so that the pressure leakage does not easily take place. Moreover, as described above, when the peripheral surface of the honeycomb structure (the pillar-like body) is corrugated, the pressure leakage is easily caused. However, a holding area of the expansion/contraction member in the holding jig according to the present invention is large. Therefore, also when the peripheral surface of the pillar-like body to be held has a corrugated shape, the pillar-like body can be held while acquiring the air tightness without causing any pressure leakage. Furthermore, when concaves and convexes are present in the peripheral surface of the honeycomb structure (the pillar-like body), the pressure leakage is easily caused. However, when the rubber tube having the excellent flexibility is selected as the expansion/contraction member and the holding force is generated by the air pressure in the holding jig according to the present invention as described previously, the rubber tube is allowed to follow the shape of the surface of the pillar-like body, thereby making it possible to hold the pillar-like body with the uniform holding force onto the peripheral surface, even in a case where the concaves and convexes are present in the peripheral surface of the pillar-like body to be held. In consequence, during the measurement of the pressure loss, seal properties can be kept.

DETAILED DESCRIPTION OF THE INVENTION

Figure 1:
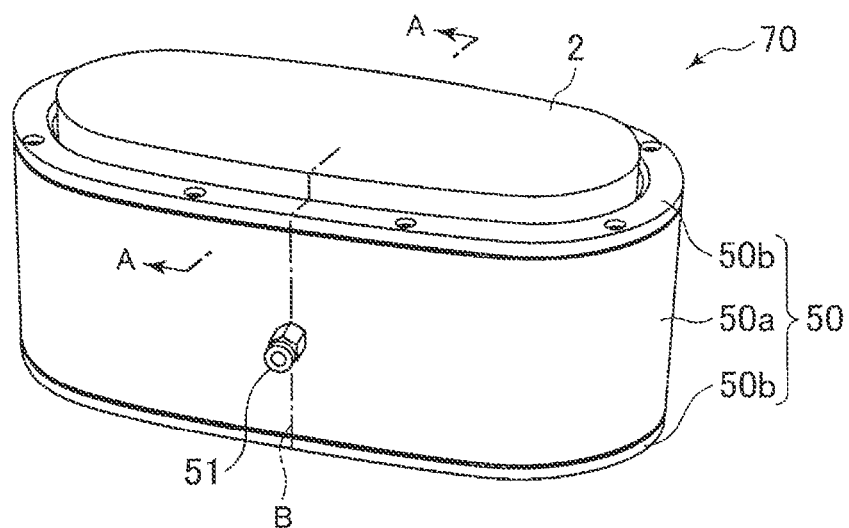
FIG. 1 is a perspective view schematically showing one embodiment of a holding jig according to the present invention.

Hereinafter, embodiments of the present invention will be described suitably with reference to the drawings, but the present invention is not limited to these embodiments when interpreted, and various alterations, modifications and improvements can be added on the basis of knowledge of a person skilled in the art without departing from the scope of the present invention. For example, the drawings show the suitable embodiments of the present invention, but the present invention is not limited by aspects shown in the drawings or information shown in the drawings. When the present invention is embodied or verified, means similar to or means equivalent to those described in the present description can be applied, but suitable means are described hereinafter.

First, one embodiment of a holding jig according to the present invention will be shown, and a constitution of the embodiment will be described with reference to FIG. 1 and FIG. 2A to FIG. 2C. A holding jig 70 shown in FIG. 1 and FIG. 2A to FIG. 2C is a holding jig holding a honeycomb structure (a pillar-like body) 2 having an irregular shape. The honeycomb structure 2 to be held is a ceramic product, and is a structure in which a cross section perpendicular to a central axis is elliptic. The holding jig 70 has a tubular jig base member 50, and a tubular rubber tube (an expansion/contraction member) 52 disposed on the side of an inner peripheral surface 60 of the jig base member 50. The holding jig 70 itself does not include the honeycomb structure 2.

The tubular jig base member 50 is further constituted of a main base member 50a and two sub base members 50b. Both end sides (upper and lower opening sides in FIG. 1 and FIG. 2A to FIG. 2C) of the rubber tube 52 are sandwiched between the main base member 50a and the two sub base members 50b, and consequently, both the end sides of the rubber tube 52 are fixed to both end sides of the tubular jig base member 50 along the whole periphery.

In the holding jig 70, a configuration of an inner peripheral surface 62 of the rubber tube 52 is, for example, 8% smaller than a surface configuration of the honeycomb structure 2 to be held. Specifically, in the holding jig 70 holding the elliptic honeycomb structure 2, the inner peripheral surface 62 of the rubber tube 52 also has an elliptic shape in a state where the rubber tube is not expanded or contracted. Moreover, a long diameter of the inner peripheral surface 62 is 8% smaller than a long diameter of the honeycomb structure 2, and a short diameter of the inner peripheral surface 62 is 8% smaller than a short diameter of the honeycomb structure 2.

On the other hand, in the holding jig 70, a configuration of the inner peripheral surface 60 of the jig base member 50 is, for example, 7 mm larger than the surface configuration of the honeycomb structure 2 to be held. Specifically, in the holding jig 70 holding the elliptic honeycomb structure 2, the inner peripheral surface 60 of the jig base member 50 also has the elliptic shape. Moreover, a long diameter of the inner peripheral surface 60 is 7 mm larger than the long diameter of the honeycomb structure 2, and a short diameter of the inner peripheral surface 60 is 7 mm larger than the short diameter of the honeycomb structure 2. According to the holding jig 70, as a shape tolerance of the honeycomb structure 2, ±3.5 mm is allowed.

The holding jig 70 has a hole 53 extending through an outer peripheral surface 61 and the inner peripheral surface 60 of the jig base member 50, and a port 51 (opening/closing means) which can open and close the hole 53. Moreover, the hole 53 is connected to an unshown vacuum generating unit (vacuum generating means) and an unshown compressor (pressurizing means) via the port 51. Specifically, although not shown in the drawings, the port 51 is connected to a piping line, and provided with a three-way valve, one branching side is connected to the vacuum generating unit, and the other sides are connected to the compressor.

In the holding jig 70, the inner peripheral surface 60 of the jig base member 50 is provided with a concave portion 55 along the whole periphery. A surface to be provided with the concave portion 55 is the inner peripheral surface 60 itself. The hole 53 is disposed to be open in the concave portion. Moreover, the hole 53 is open at one position, but connection to the hole 53 is accomplished by forming a groove 54 along the whole periphery in the inner peripheral surface 60 (the concave portion) of the jig base member 50. In other words, the hole 53 is formed in the groove 54.

In the holding jig 70, an axial length of the jig base member 50 is, for example, 8 mm smaller than an axial length of the honeycomb structure 2. Therefore, the large honeycomb structure 2 projects only a little from the jig base member 50, and hence by grasping the upper end surface of the honeycomb structure 2, the honeycomb structure 2 can be removed or mounted.

Subsequently, a method of using the holding jig according to the present invention will be described with respect to the example of the holding jig 70 described above. As described previously, in the holding jig 70, the configuration of the inner peripheral surface 62 of the rubber tube 52 in a natural state where the rubber tube is not expanded or contracted (see FIG. 2A) is smaller than the surface configuration of the honeycomb structure 2 (see FIG. 2A and FIG. 2B). Therefore, first, the above three-way valve is operated on a side connected to the above vacuum generating unit, and the vacuum generating unit is operated to generate a vacuum in a space between the jig base member 50 and the rubber tube 52 through the hole 53. In this case, the rubber tube 52 is sucked toward the outside, and attached to the surface (the surface provided with the concave portion 55) of the jig base member 50, with the result that the inner periphery of the rubber tube 52 expands (see FIG. 2B).

Figure 2A:
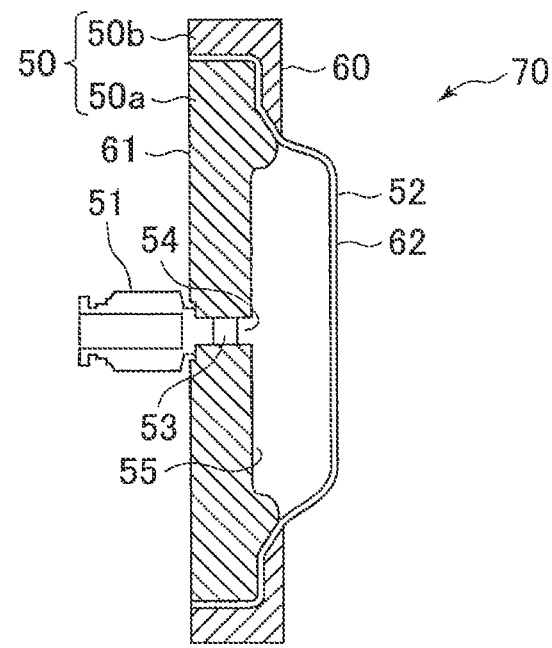
FIG. 2A is a cross-sectional view schematically showing the embodiment of the holding jig according to the present invention, and a view showing a cross section taken along a broken line B of FIG. 1 in a natural state where a tubular expansion/contraction member is not expanded or contracted.
Figure 2B:
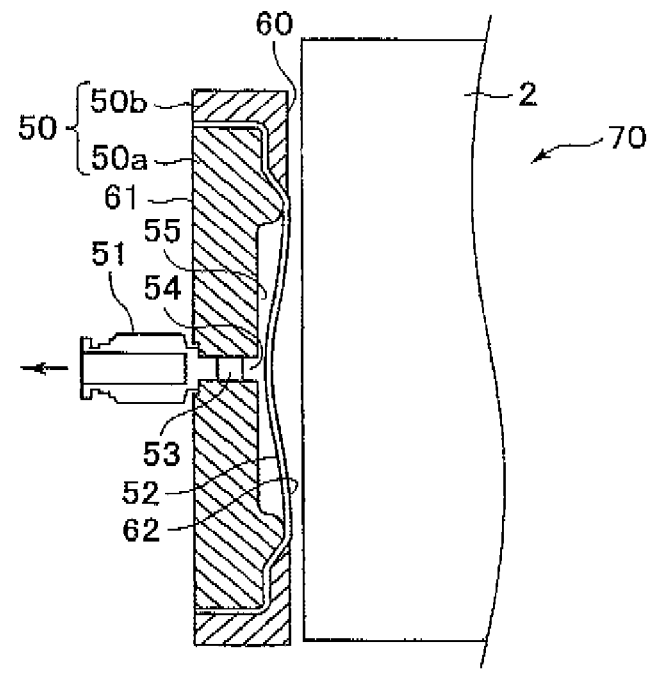
FIG. 2B is a cross-sectional view schematically showing the embodiment of the holding jig according to the present invention, and a view showing the cross section taken along the broken line B of FIG. 1 in a state where a pillar-like body is contained.
Figure 2C:
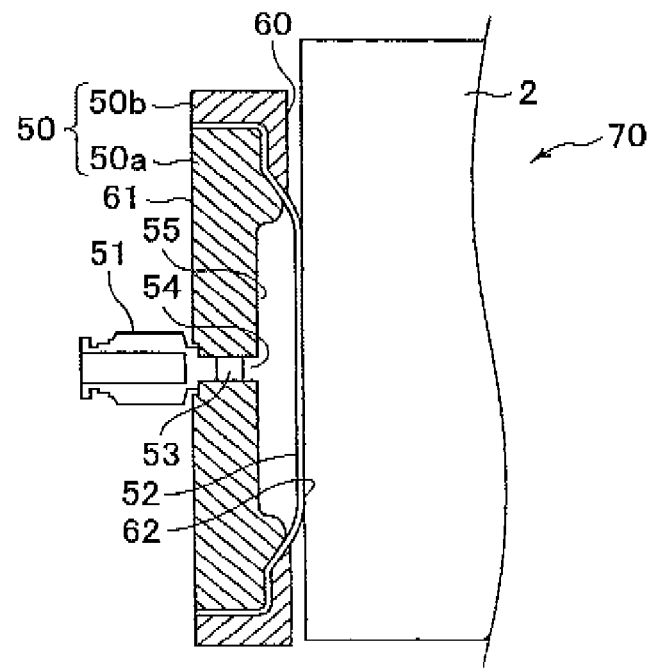
FIG. 2C is a cross-sectional view schematically showing the embodiment of the holding jig according to the present invention, and a view showing the cross section taken along the broken line B of FIG. 1 in a state where the pillar-like body is held.

On the other hand, the configuration of the inner peripheral surface 60 of the jig base member 50 is larger than the surface configuration of the honeycomb structure 2 (see FIG. 2B and FIG. 2C). Therefore, when the inner periphery of the rubber tube 52 is in the expanded state, the honeycomb structure 2 can be contained in the jig base member 50. Afterward, when the vacuum generating unit is stopped to once return a pressure in the hole 53 to an atmospheric pressure, the small rubber tube 52 comes in contact under pressure with the honeycomb structure 2, to hold the honeycomb structure 2. This state may be kept, but when the above three-way valve is operated on a side connected to the above compressor and the compressor is operated to supply the air from the hole 53, the air flows along the whole periphery immediately after traveling along the groove 54, thereby increasing the pressure in the space between the jig base member 50 and the rubber tube 52. In this case, the rubber tube 52 stretches toward the honeycomb structure 2, and more strongly comes in contact under pressure with the honeycomb structure 2, so that the honeycomb structure 2 is firmly held.

Figure 3A:
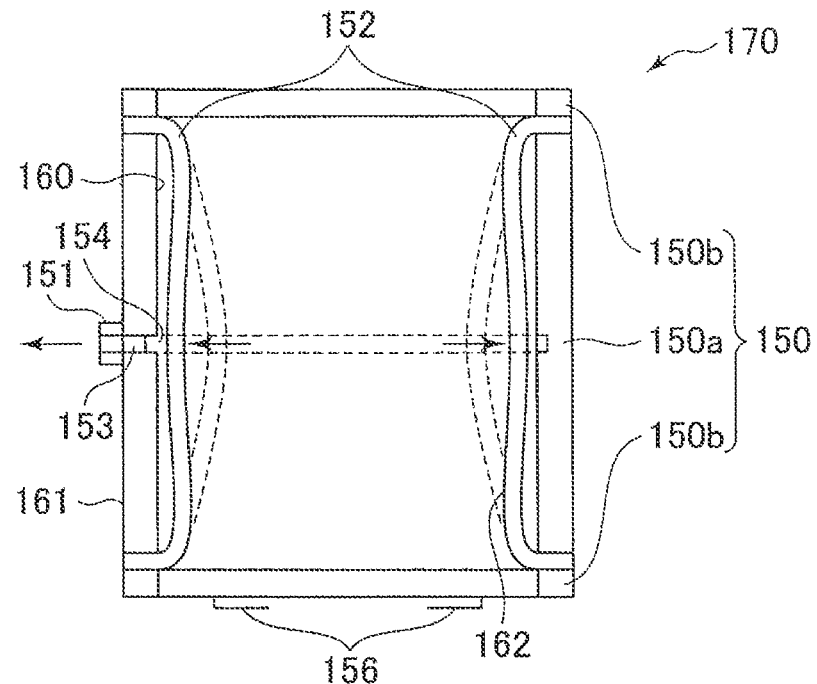
FIG. 3A is a cross-sectional view schematically showing another embodiment of the holding jig according to the present invention, and a view showing a cross section taken along the arrow lines AA of FIG. 1 in a state immediately before a pillar-like body is contained.
Figure 3B:
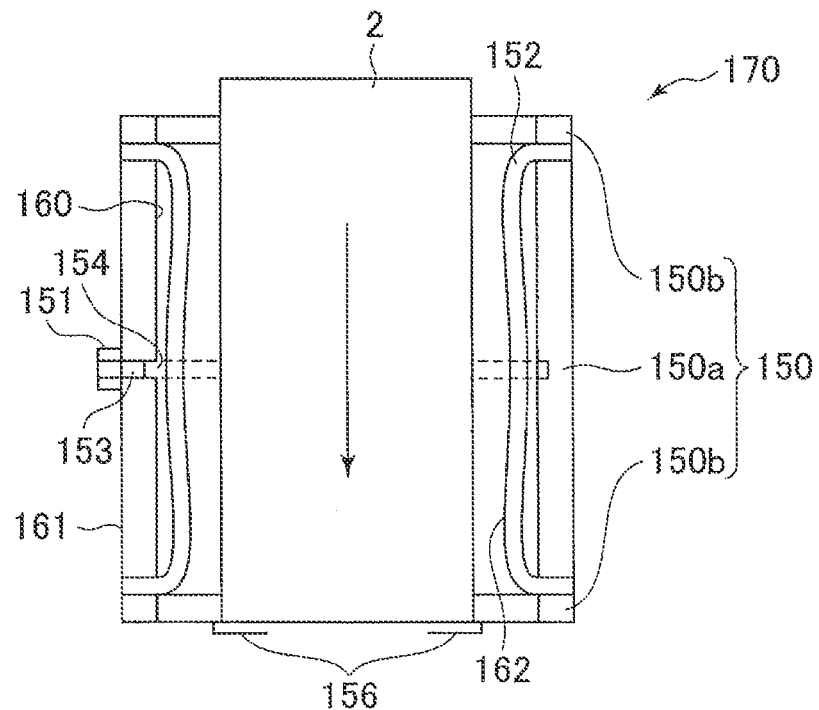
FIG. 3B is a cross-sectional view schematically showing the embodiment of the holding jig according to the present invention, and a view showing the cross section taken along the arrow lines AA of FIG. 1 in a state immediately after the pillar-like body is contained.
Figure 3C:
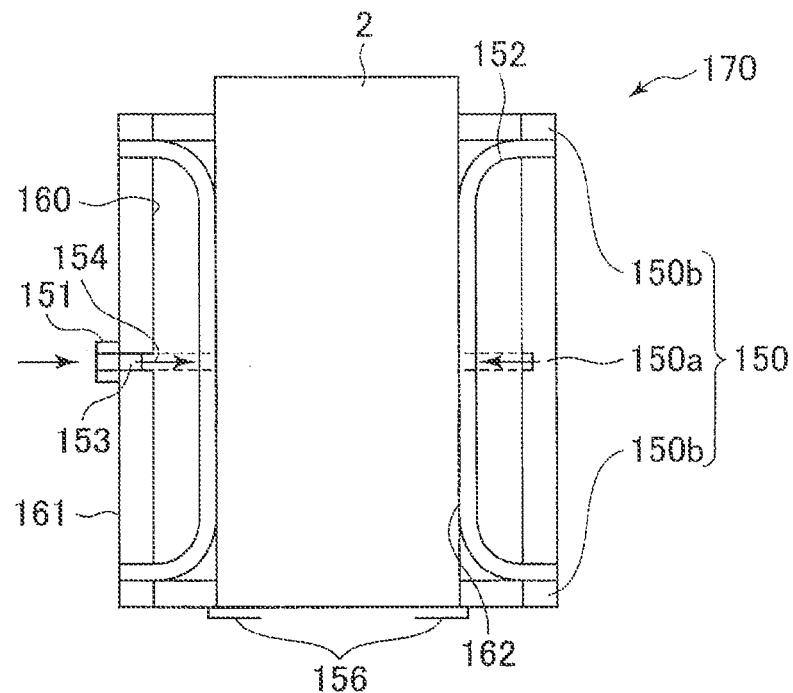
FIG. 3C is a cross-sectional view schematically showing the embodiment of the holding jig according to the present invention, and a view showing the cross section taken along the arrow lines AA of FIG. 1 in a state where the contained pillar-like body is held.

Next, another embodiment of the holding jig according to the present invention will be shown, and a constitution of the embodiment will be described with reference to FIG. 3A to FIG. 3C. A holding jig 170 shown in FIG. 3A to FIG. 3C is a holding jig holding the honeycomb structure 2 having an irregular shape in the same manner as in the holding jig 70. The holding jig 170 has a tubular jig base member 150, and a tubular rubber tube 152 disposed on the side of an inner peripheral surface 160 of the jig base member 150. The holding jig 170 itself does not include the honeycomb structure 2.

The tubular jig base member 150 is further constituted of a main base member 150a and two sub base members 150b. Both end sides (upper and lower opening sides in FIG. 3A to FIG. 3C) of the rubber tube 152 are sandwiched between the main base member 150a and the two sub base members 150b, and consequently, both the end sides of the rubber tube 152 are fixed to both end sides of the tubular jig base member 150 along the whole periphery.

In the holding jig 170, a configuration of an inner peripheral surface 162 of the rubber tube 152 is, for example, 12% smaller than a surface configuration of the honeycomb structure 2 to be held. Specifically, in the holding jig 170 holding the elliptic honeycomb structure 2, the inner peripheral surface 162 of the rubber tube 152 also has an elliptic shape in a state where the rubber tube is not expanded or contracted. Moreover, a long diameter of the inner peripheral surface 162 is 12% smaller than a long diameter of the honeycomb structure 2, and a short diameter of the inner peripheral surface 162 is 12% smaller than a short diameter of the honeycomb structure 2.

On the other hand, in the holding jig 170, the configuration of the inner peripheral surface 160 of the jig base member 150 is, for example, 12 mm larger than the surface configuration of the honeycomb structure 2 to be held. Specifically, in the holding jig 170 holding the elliptic honeycomb structure 2, the inner peripheral surface 160 of the jig base member 150 also has the elliptic shape. Moreover, a long diameter of the inner peripheral surface 160 is 12 mm larger than a long diameter of the honeycomb structure 2, and a short diameter of the inner peripheral surface 160 is 12 mm larger than a short diameter of the honeycomb structure 2. According to the holding jig 170, as a shape tolerance of the honeycomb structure 2, ±6 mm is allowed.

The holding jig 170 has a hole 153 extending through an outer peripheral surface 161 and the inner peripheral surface 160 of the jig base member 150, and a port 151 (opening/closing means) which can open and close the hole 153. Moreover, the hole 153 is connected to an unshown vacuum generating unit and an unshown compressor via the port 151. Specifically, although not shown in the drawings, the port 151 is connected to a piping line, and provided with a three-way valve, one branching side is connected to the vacuum generating unit, and the other sides are connected to the compressor.

As described above, the holding jig 170 has about the same structure as the holding jig 70, but the holding jig 170 is different in that the inner peripheral surface 160 of the jig base member 150 is not provided with a concave portion. However, the holding jig is the same in that connection to the hole 153 is accomplished by forming a groove 154 along the whole periphery in the inner peripheral surface 160 (which is not the concave portion) of the jig base member 150.

In the holding jig 170, an axial length of the jig base member 150 is, for example, 10 mm smaller than an axial length of the honeycomb structure 2. Therefore, the large honeycomb structure 2 projects only a little from the jig base member 150, and hence by grasping the upper end surface of the honeycomb structure 2, the honeycomb structure 2 can be removed or mounted. Moreover, in the holding jig 170, claw members 156 are arranged at a lower end. A holding force based on expansion/contraction properties of the rubber tube 152 always acts on the honeycomb structure 2. However, even when damages due to deterioration of the rubber tube 152 and the like are rapidly caused and the holding force is lost, the claw members 156 can prevent falling of the honeycomb structure 2.

Subsequently, a method of using the holding jig according to the present invention will be described with respect to the example of the holding jig 170 described above. As described previously, in the holding jig 170, the configuration of the inner peripheral surface 162 of the rubber tube 152 in a natural state where the rubber tube is not expanded or contracted (see FIG. 3A) is smaller than the surface configuration of the honeycomb structure 2 (see FIG. 3A and FIG. 3B). Therefore, first, the above three-way valve is operated on a side connected to the above vacuum generating unit, and the vacuum generating unit is operated to generate a vacuum in a space between the jig base member 150 and the rubber tube 152 through the hole 153. In this case, the rubber tube 152 is sucked toward the outside, and attached to the surface (the inner peripheral surface which is not provided with the concave portion) of the jig base member 150, with the result that the inner periphery of the rubber tube 152 expands (see FIG. 3A and FIG. 3B).

On the other hand, the configuration of the inner peripheral surface 160 of the jig base member 150 is larger than the surface configuration of the honeycomb structure 2 (see FIG. 3B and FIG. 3C). Therefore, when the inner periphery of the rubber tube 152 is in the expanded state, the honeycomb structure 2 can be contained in the jig base member 150. Afterward, when the vacuum generating unit is stopped to once return a pressure in the hole 153 to an atmospheric pressure, the small rubber tube 152 comes in contact under pressure with the honeycomb structure 2, to hold the honeycomb structure 2. This state may be kept, but when the above three-way valve is operated on a side connected to the above compressor and the compressor is operated to supply the air from the hole 153, the air flows along the whole periphery immediately after traveling along the groove 154, thereby increasing the pressure in the space between the jig base member 150 and the rubber tube 152. In this case, the rubber tube 152 stretches toward the honeycomb structure 2, and more strongly comes in contact under pressure with the honeycomb structure 2, so that the honeycomb structure 2 is firmly held.

Next, a method of preparing the holding jig according to the present invention will be described with respect to the example of the holding jig 70 described above. The holding jig 70 is obtained by suitably processing and assembling a heretofore known material. As the rubber tube 52, a silicon rubber or the like can be employed, and, for example, a rubber tube, which is to be cut into commercially available amber-color rubber bands, can especially suitably be used. This rubber tube is usually made of a natural rubber. There is not any special restriction on a material of the jig base member 50 (the main base member 50a and the sub base members 50b), as long as the member has an excellent durability and can realize a shape accuracy. The jig base member is preferably obtained by processing one of iron, stainless steel, resin, and light metal (aluminum, magnesium or the like). According to this material, the jig base member is easy to use, and an outer shape accuracy of the jig base member 50 can be kept to be high, for example, so as to match a conventional pressure loss measuring device to be applied.

Figure 4A:
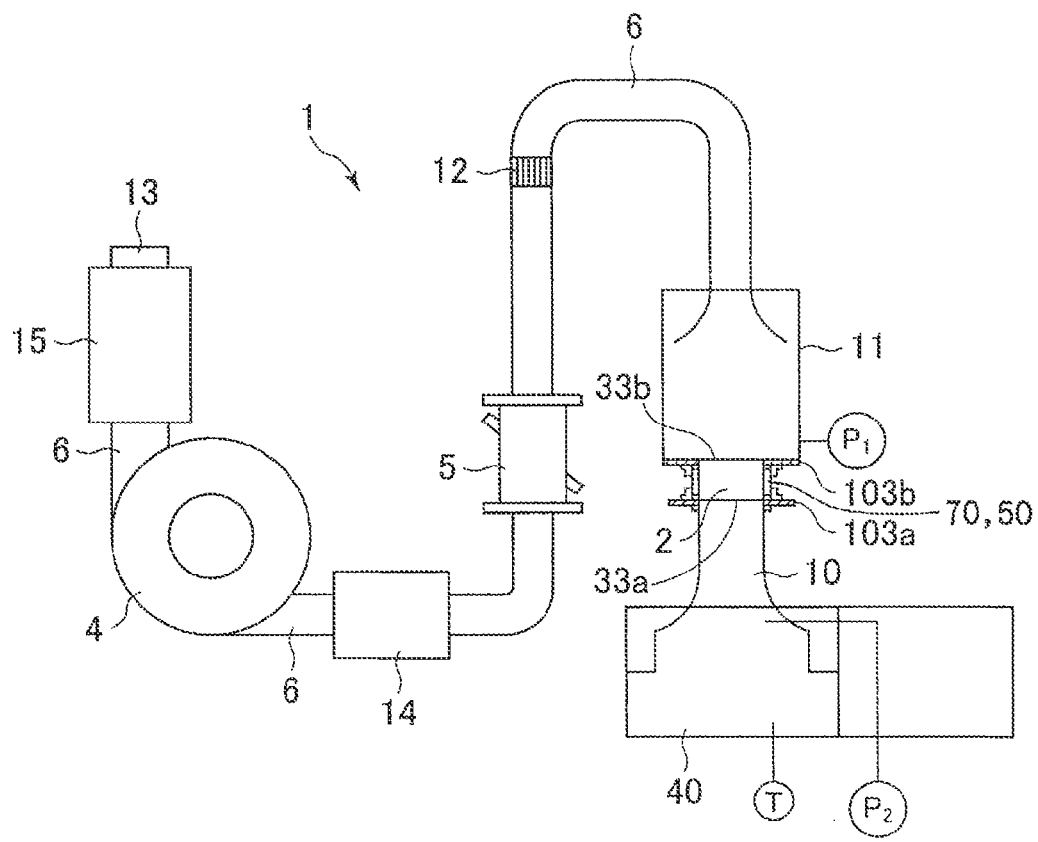
FIG. 4A is a constitutional view schematically showing one embodiment of a pressure loss measuring device according to the present invention.
Figure 4B:
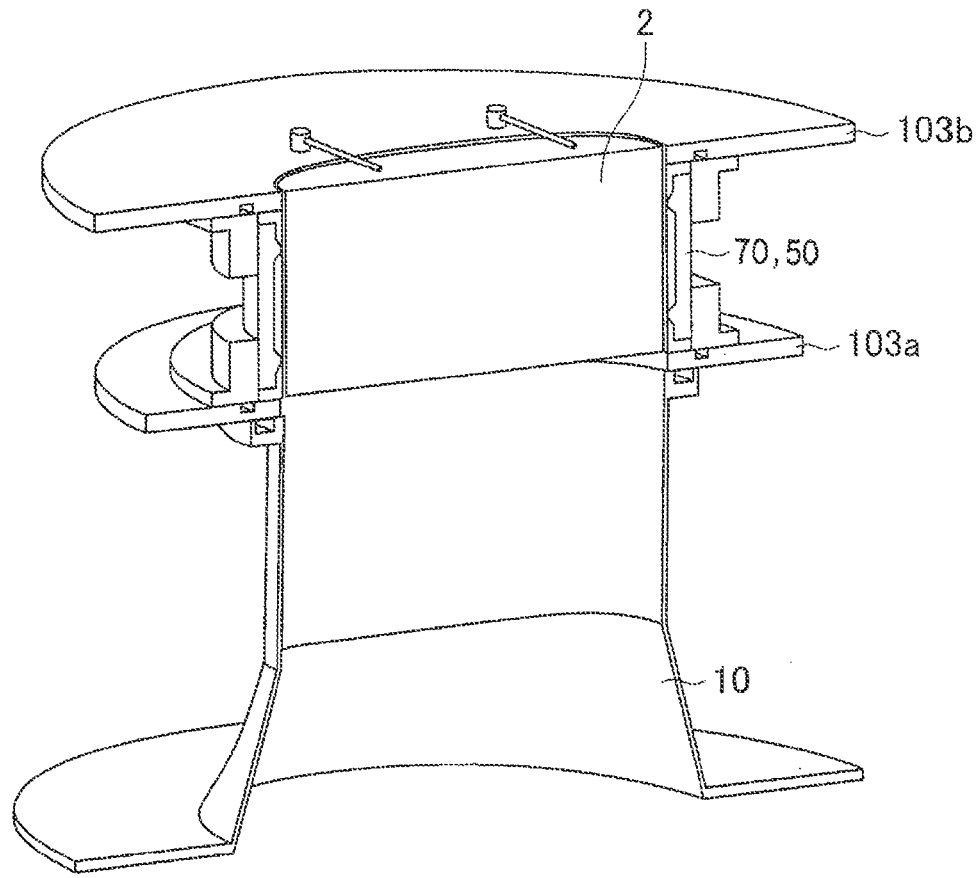
FIG. 4B is a perspective view schematically showing an enlarged part of the embodiment of the pressure loss measuring device according to the present invention.

Next, one embodiment of a pressure loss measuring device according to the present invention will be shown, and a constitution of the embodiment will be described with reference to FIG. 4A and FIG. 4B. A pressure loss measuring device 1 shown in FIG. 4A and FIG. 4B uses, as honeycomb structure holding means, the holding jig 70 (the jig base member 50) described above. The pressure loss measuring device 1 can measure a pressure loss in a space between an inflow end surface 33a side and an outflow end surface 33b side of the honeycomb structure 2 including through channels.

The pressure loss measuring device 1 is provided with main body side holding jigs 103a and 103b to be combined with the holding jig 70. A static pressure chamber 11 provided with a pressure gauge P1 is disposed on the side of the main body side holding jig 103b as seen from the honeycomb structure 2 held by the holding jig 70, and the honeycomb structure is connected to a through channel 6 via the chamber. On the other hand, on the side of the main body side holding jig 103a, a rectification nozzle 10 is disposed, and the honeycomb structure is connected to a sample box 40 via the nozzle. The sample box 40 is provided with measuring means which can measure physical amounts (e.g., a temperature, the atmospheric pressure, etc.) indicating a measuring environment, during the measurement of the pressure loss of the honeycomb structure 2. Examples of the means include a thermometer T and a pressure gauge P2. Moreover, the static pressure chamber 11 provided with the pressure gauge P1 and the sample box 40 provided with the at least pressure gauge P2 constitute pressure loss measuring means.

The pressure loss measuring device 1 includes a blower 4. The blower 4 is fluid passing means for driving so that a fluid (air) passes through the honeycomb structure 2. The blower 4 may have a performance (a rotation number (a speed), air volume displacement, or the like) in accordance with a size of the honeycomb structure 2 which is a measurement object, a size of a value of the pressure loss, or the like. As the blower 4, it is preferable to use a blower in which the rotation number can be inverter-controlled. Moreover, the preferable blower 4 is a turbo blower having a discharge pressure of 5 kPa or more. This is because generation of pulsation of the fluid (the air) allowed to flow can be suppressed, and accurate flow rate setting and the measurement of the pressure loss with less measurement error can be performed.

The pressure loss measuring device 1 includes the through channel 6 which communicates from the sample box 40 as an air inlet port to a silencer. The through channel 6 interconnects the honeycomb structure holding means, the fluid passing means, flow rate measuring means, and the pressure loss measuring means to one another, so that the air can pass through these means. Moreover, the pressure loss measuring device 1 includes an ultrasonic flowmeter 5. The ultrasonic flowmeter 5 is the flow rate measuring means for measuring the flow rate of the air passing through the honeycomb structure 2. On an upstream side of the ultrasonic flowmeter 5, rectifying means such as a rectification honeycomb 12 is disposed, thereby making it possible to stably measure the flow rate with less error. On the upstream side and a downstream side of the blower 4 which is the fluid passing means, silencers (a suction silencer 14 and a discharge silencer 15) are arranged, to alleviate noise of the blower 4. Furthermore, according to the main body side holding jigs 103a and 103b and the holding jig 70 according to the present invention, the honeycomb structure 2 can suitably be held in which end surfaces are not closed. Therefore, it is possible to more accurately measure the pressure loss.

Next, a method of using the pressure loss measuring device according to the present invention will be described with respect to an example where the pressure loss of the honeycomb structure 2 is measured by using the pressure loss measuring device 1 described above. First, the honeycomb structure 2 is held by the holding jig 70. Next, the honeycomb structure 2 held by the holding jig 70 is incorporated in the pressure loss measuring device 1 by the main body side holding jigs 103a and 103b. That is, when the holding jig 70 according to the present invention is incorporated in the pressure loss measuring device 1, the holding jig is positioned as an intermediate jig. Next, the blower 4 is driven so that the air is sucked from the sample box 40 through the through channel 6, allowed to pass through the honeycomb structure 2, and discharged from a discharge port 13. At this time, monitoring of a measured value of the flow rate of the air by the ultrasonic flowmeter 5 is performed, to regulate the rotation number of the blower 4. Moreover, the pressure loss may be obtained by the pressure gauges P1 and P2.

Next, another embodiment of the pressure loss measuring device according to the present invention will be shown, and a combination of the holding jig according to the present invention and the main body side holding jigs will be described with reference to FIG. 5A and FIG. 5B. Holding jigs 270 and 370 (jig base members 250 and 350) shown in FIG. 5A and FIG. 5B correspond to the holding jigs 70 and 170 (the jig base members 50 and 150) described above. Moreover, main body side holding jigs 203a, 203b, 303a and 303b shown in FIG. 5A and FIG. 5B correspond to the main body side holding jigs 103a and 103b described above. Furthermore, portions surrounded with dotted lines in FIG. 5A and FIG. 5B are portions to be sealed.

Figure 5A:
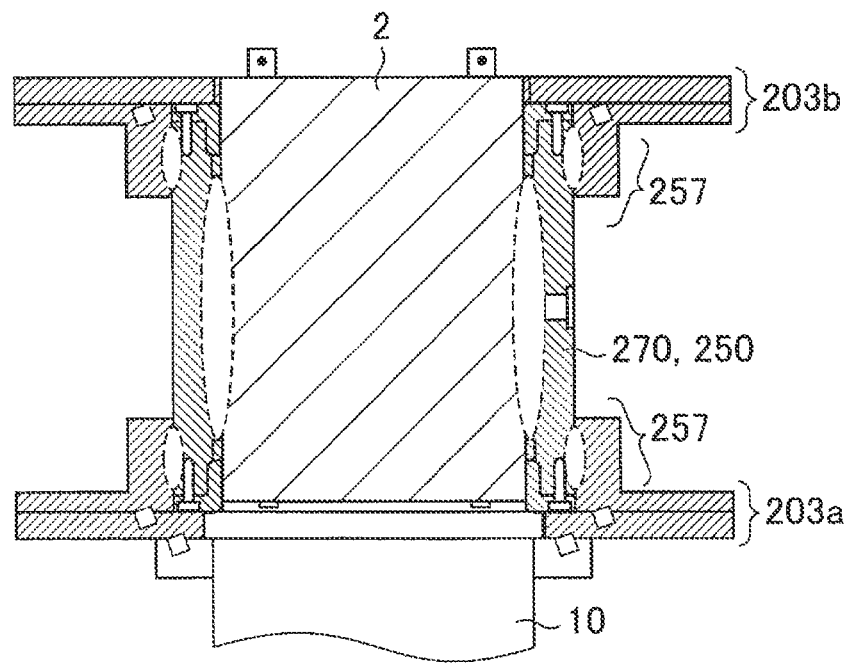
FIG. 5A is a perspective view schematically showing an enlarged part of another embodiment of the pressure loss measuring device according to the present invention.

As shown in FIG. 5A, the main body side holding jigs 203a and 203b have chuck portions 257, respectively, and the holding jig 270 (the jig base member 250) is fixed by the chuck portions 257, so that seal portions (spaces) are produced among the portions and the jig. In this way, the honeycomb structure 2 held by the holding jig 270 is incorporated in the pressure loss measuring device by the main body side holding jigs 203a and 203b. When the main body side holding jigs 203a and 203b are used, the seal portions (the spaces) are present at three positions.

Figure 5B:
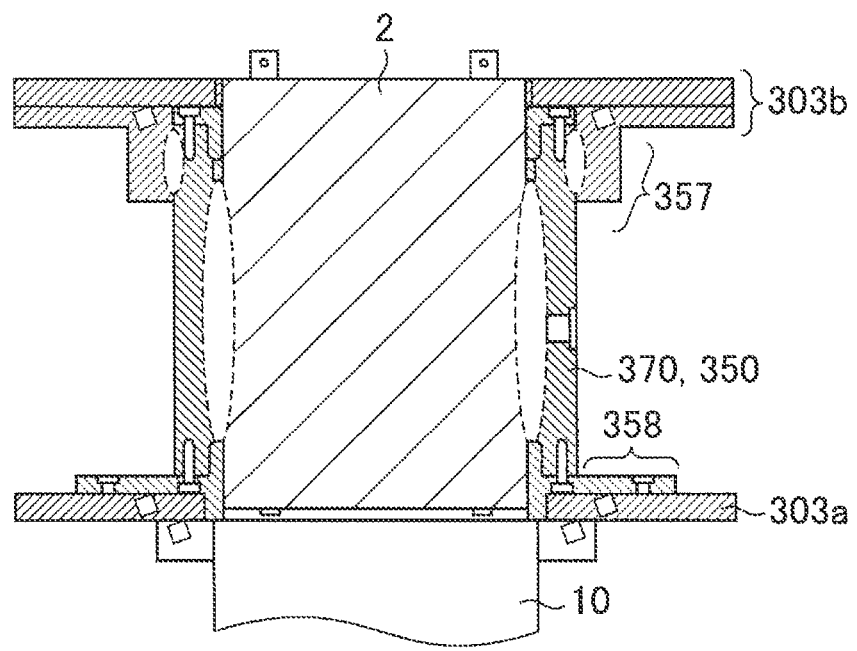
FIG. 5B is a perspective view schematically showing an enlarged part of still another embodiment of the pressure loss measuring device according to the present invention.

On the other hand, in the main body side holding jigs shown in FIG. 5B, the main body side holding jig 303b (on the upside in the drawing) has a chuck portion 357, but the main body side holding jig 303a (on the downside in the drawing) does not have any chuck portions. Instead, on the side of the holding jig 370 (according to the present invention) shown in FIG. 5B, a flange 358 is disposed. The flange 358 is fixed to the main body side holding jig 303a, thereby incorporating the honeycomb structure 2 held by the holding jig 370 in the pressure loss measuring device. It is to be noted that the main body side holding jig 303b is fixed to the holding jig 370 (the jig base member 350) by the chuck portion 357 in the same manner as in the main body side holding jigs 203a and 203b. When the main body side holding jigs 303a and 303b are used, seal portions (spaces) are present at two positions, and decrease as compared with the case where the main body side holding jigs 203a and 203b are used. Therefore, a risk of air leakage also decreases, when the main body side holding jigs 303a and 303b are used.

Additionally, although not shown in the drawings, it is also preferable that both main body side holding jigs (on the upside and downside) are not provided with any chuck portions and that flanges are disposed on both sides of the holding jig (according to the present invention). In this case, on either side, the flange is fixed to the main body side holding jig, thereby incorporating the honeycomb structure held by the holding jig in the pressure loss measuring device. Moreover, the seal portion (the space) is present at one position, and the risk of air leakage is minimized.

INDUSTRIAL APPLICABILITY

The holding jig according to the present invention can be utilized as means for holding any pillar-like body. In particular, it is possible to suitably utilize the holding jig as means for holding a pillar-like honeycomb structure which is a catalyst loading body or filter itself.

DESCRIPTION OF REFERENCE NUMERALS

1: pressure loss measuring device
2: honeycomb structure
4: blower
5: ultrasonic flowmeter
6: through channel
10: rectification nozzle
11: static pressure chamber
12: rectification honeycomb
13: discharge port
14: suction silencer
15: discharge silencer
33a: inflow end surface
33b: outflow end surface
40: sample box
50, 150, 250 and 350: jig base member
50a and 150a: main base member
50b and 150b: sub base member
51 and 151: port
52 and 152: rubber tube
53 and 153: hole
54 and 154: groove
55: concave portion
60 and 160: inner peripheral surface (of the jig base member)
61 and 161: outer peripheral surface (of the jig base member)
62 and 162: inner peripheral surface (of the rubber tube)
70, 170, 270 and 370: holding jig
103a, 103b, 203a, 203b, 303a and 303b: main body side holding jig
156: claw member
257 and 357: chuck portion
358: flange
P1 and P2: pressure gauge
T: thermometer

The invention claimed is:

1. A holding jig holding a pillar body, comprising a tubular jig base member, and a tubular member, which is expandable and contractible and which is disposed on an inner peripheral surface side of the tubular jig base member, the tubular member and the tubular jig base member respectively having two end sides, with each end side having a whole periphery,
wherein both end sides of the tubular member are fixed to both end sides of the tubular jig base member along the whole periphery of each respective end side,
a configuration of an inner peripheral surface of the tubular member is smaller than a surface configuration of the pillar body to be held, and
a configuration of the inner peripheral surface of the tubular jig base member is larger than the surface configuration of the pillar body to be held, and
wherein the inner peripheral surface of the tubular jig base member, which has a whole periphery, is provided with a concave portion along the whole periphery and a groove is formed in the concave portion, and
the tubular member is a rubber tube.

2. The holding jig according to claim 1,
wherein the configuration of the inner peripheral surface of the tubular member is from 3 to 50% smaller than the surface configuration of the pillar body to be held.

3. The holding jig according to claim 2,
wherein the configuration of the inner peripheral surface of the tubular jig base member is larger than the surface configuration of the pillar body to be held as much as a difference in a range of more than 1 mm and 20 mm or less.

4. The holding jig according to claim 3, which has a hole extending through an outer peripheral surface and the inner peripheral surface of the tubular jig base member, and means for opening and closing the hole,
wherein the hole is connected to vacuum generating means via the means for opening and closing the hole.

5. The holding jig according to claim 2, which has a hole extending through an outer peripheral surface and the inner peripheral surface of the tubular jig base member, and means for opening and closing the hole,
wherein the hole is connected to vacuum generating means via the means for opening and closing the hole.

6. The holding jig according to claim 1,
wherein the configuration of the inner peripheral surface of the tubular jig base member is larger than the surface configuration of the pillar body to be held as much as a difference in a range of more than 1 mm and 20 mm or less.

7. The holding jig according to claim 6, which has a hole extending through an outer peripheral surface and the inner peripheral surface of the tubular jig base member, and means for opening and closing the hole,
wherein the hole is connected to vacuum generating means via the means for opening and closing the hole.

8. The holding jig according to claim 1, which has a hole extending through an outer peripheral surface and the inner peripheral surface of the tubular jig base member, and means for opening and closing the hole,
wherein the hole is connected to vacuum generating means via the means for opening and closing the hole.

9. The holding jig according to claim 8,
wherein the hole is connected to pressurizing means via the means for opening and closing the hole.

10. The holding jig according to claim 1,
wherein a material of the rubber tube is a natural rubber.

11. The holding jig according to claim 1,
wherein an axial length of the tubular jig base member is smaller than an axial length of the pillar body to be held as much as a difference in a range of 5 mm or more and 10 mm or less.

12. The holding jig according to claim 1,
wherein the pillar body to be held is a honeycomb structure.

13. The holding jig according to claim 12,
wherein the honeycomb structure is made of a ceramic material and has an irregular shape.

14. The holding jig according to claim 1 further comprising a pressure loss measuring device to measure a pressure loss of a fluid through the pillar body, wherein the pillar body to be held is a honeycomb structure.

15. The holding jig according to claim 14, wherein the honeycomb structure is made of a ceramic material and has an irregular shape.

* * * * *